March 1, 1966 JAMES E. WEBB 3,237,253
ADMINISTRATOR OF THE NATIONAL AERONAUTICS
AND SPACE ADMINISTRATION
METHOD OF MAKING SCREEN BY CASTING
Filed Jan. 7, 1964 2 Sheets-Sheet 1
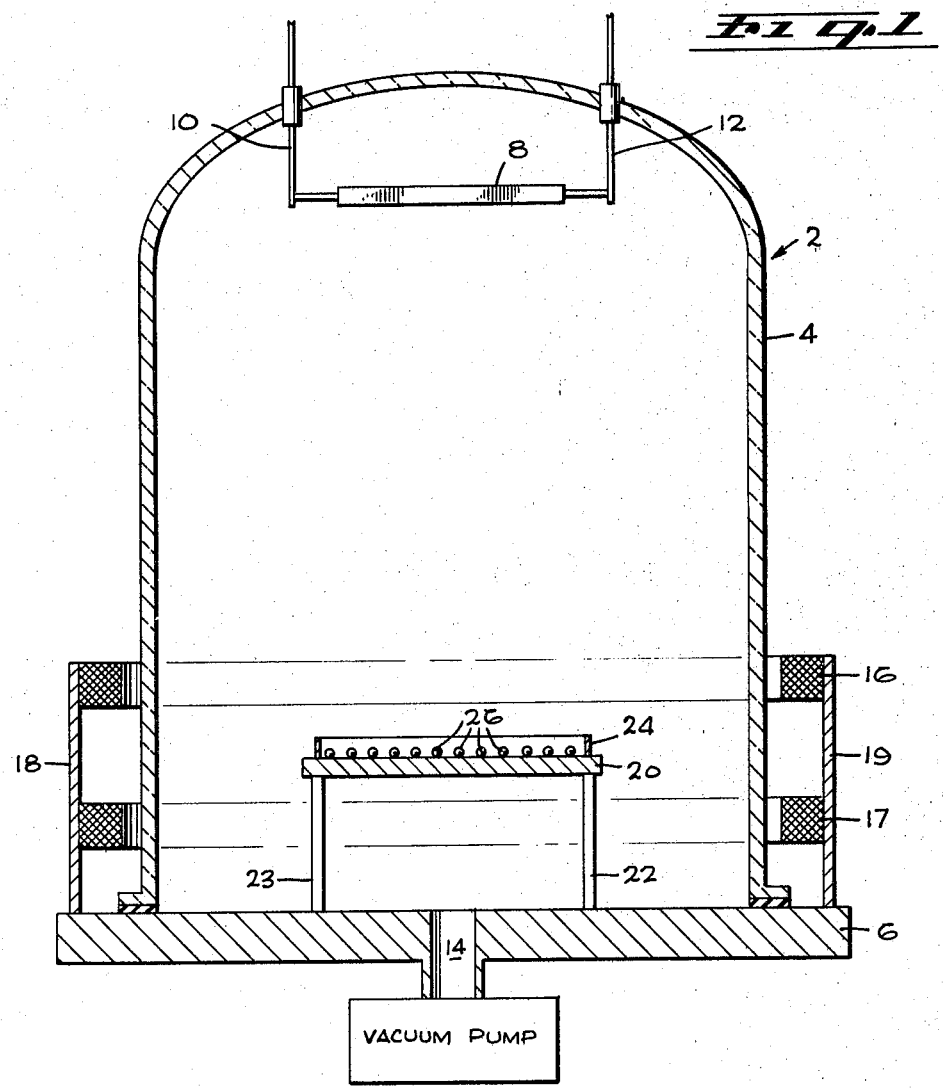
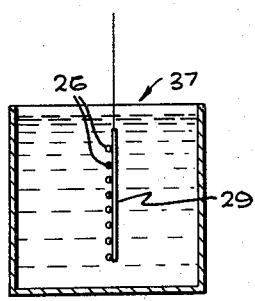
SIEGFRIED HANSEN
INVENTOR.
BY
Charles C. Wells
ATTORNEYS March 1, 1966 JAMES E. WEBB 3,237,253
ADMINISTRATOR OF THE NATIONAL AERONAUTICS
AND SPACE ADMINISTRATION
METHOD OF MAKING SCREEN BY CASTING
Filed Jan. 7, 1964 2 Sheets-Sheet 2
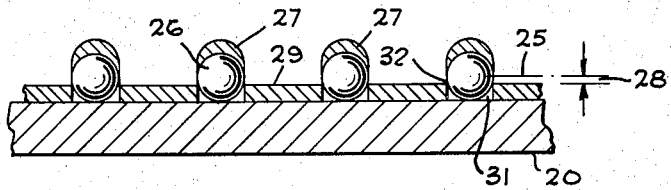
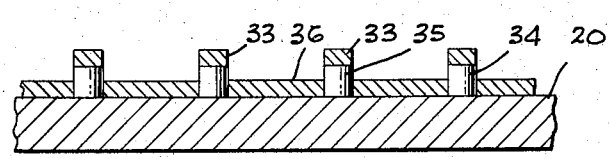
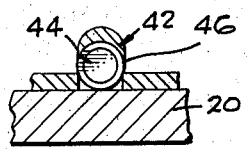
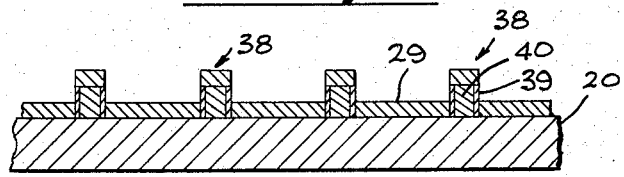
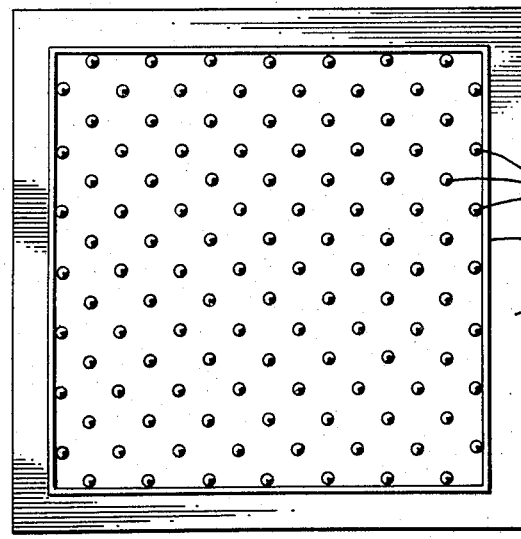
SIEGFRIED HANSEN
INVENTOR.
BY
ATTORNEYS United States Patent Office 3,237,253
Patented Mar. 1, 1966

3,237,253
METHOD OF MAKING SCREEN BY CASTING
James E. Webb, Administrator of the National Aeronautics and Space Administration with respect to an invention of Siegfried Hansen
Filed Jan. 7, 1964, Ser. No. 336,320
5 Claims. (Cl. 22—200)

This invention relates to the manufacture of mesh or screen and more particularly it relates to a method of making screen in which the fineness of mesh is essentially unlimited and the screen can be made in any desired thickness regardless of mesh size.

The prior art is replete with methods of fabricating screen, but these methods are complicated and have undesirable limitations which are eliminated by the present invention. For example, the maximum fineness of mesh which can be obtained by conventional methods of making screen is in the vicinity of five hundred holes per linear inch. Further, as the mesh is made finer the screen thickness which can be had are limited and thus, for many applications, even though a screen of the proper mesh can be made, such screen is too thin and flimsy.

There is a need in the field of electronics, particularly in electronic tubes and ion devices, for grids or screens having a fine mesh. The present invention provides a method of making screen which has more than five hundred holes per linear inch and can be made in any desired thickness. This is accomplished, breifly, by positioning a large number of particles in a single layer on a plate, the number of particles corresponding to the number of holes per linear inch desired in the screen. A film or coating of a suitable material is then applied to the plate and this film partially surrounds the particles. The film and particles are then removed from the plate and placed in a suitable chemical reagent where the particles are dissolved out and only the film, with perforations where the particles were, remains. The present invention, in addition to having the advantages mentioned above, also provides an improved and simpler method of making ordinary screen having a relatively coarse mesh.

It is therefore a principal object of this invention to provide an improved and simplified process for making mesh or screen.

An additional object of this invention is to provide a method of making a screen having a very fine mesh.

A yet further object of this invention is to provide a method of making a screen wherein the thickness of such screen is not limited or determined by the size of the holes therein.

Other objects and advantages of the present invention will be more fully understood by considering the following detailed description, in conjunction with the accompanying drawings; wherein:

FIG. 1 is a side elevation, partially in section, illustrating vacuum evaporator apparatus employed in carrying out the invention.

FIG. 2 is a plan view of the plate with the removable rim mounted thereon and a plurality of spherical particles dispersed on the plate in a uniform array.

FIG. 3 is a view of a portion of the plate with the spherical particles disposed thereon and a tungsten film deposited on said plate around the particles.

FIG. 4 is a view similar to FIG. 3 illustrating the use of rod-shaped particles rather than spherical particles.

FIG. 5 is similar to FIG. 4 except that the rod-shaped iron particles have a coating of aluminum applied thereto.

FIG. 6 illustrates an embodiment wherein spherical particles of iron having an aluminum coating applied thereto are utilized.

FIG. 7 shows a vat of chemical reagent with a film and particles immersed therein.

Referring now to the drawing, the apparatus illustrated in FIG. 1 is a vacuum evaporator which is employed to practice the present invention. The vacuum evaporator includes a belljar 4 which is adapted to be mounted on a base 6. Belljar 4 has a heater element 8 mounted in the upper portion thereof and heater element 8 has electrical connections 10 and 12 connected thereto which extend outside the belljar for connecting the heater element to a current source (not shown). Base 6 has an aperture 14 formed therein to which a vacuum pump is connected for producing a vacuum within the belljar. A pair of Helmholtz coils 16 and 17 are arranged around and closely adjacent to the belljar and these coils are supported by support means 18 and 19 mounted to the base. A plate 20 is supported within the belljar on a pair of supports 22 and 23. Plate 20 has a removable rim 24 mounted thereon and a plurality of particles 26 are positioned on the plate within the area defined by rim 24. Rim 24 can be held in position by any suitable means (not shown).

The practice of the present invention requires that particles 26 be substantially evenly distributed in a single layer over the surface of plate 20 within the area bounded by rim 24 (see FIG. 2). The quantity of particles placed on plate 20 is such that there is one particle present for each hole desired in the finished screen. Particle size is determined by the size holes desired in the finished screen in that the holes in the finished screen corespond substantially to the size of the particles. The particles are disposed in a single layer when they are poured or placed on plate 20. The particles do not occupy all the surface area of the plate within rim 24 and therefore the particles tend to spread out in a single layer as they are poured on the plate. If necessary, the particles can be vibrated, by tapping the plate, to assure that the particles are reduced to a single layer. Even spacing or distribution of the particles is achieved, as will be discussed in more detail hereinafter, by subjecting the particles to the magnetic field generated by the Helmholtz coil. In exhibit uniform magnetic properties. Therefore, the particles, shown as spherical in FIG. 2, must be uniform suitable magnetic material having sufficient magnetic permeability to be magnetized by the magnetic field generated when the Helmholtz coils are energized. The quantity and size of particles used is determined by the fineness of mesh desired in the screen being made.

Referring again to FIG. 1, with the belljar removed (not shown) a plurality of particles are placed in a single layer on the plate within the area defined by the rim. The Helmholtz coils are then energized to create a vertically oriented uniform magnetic field in the area occupied by the plate 20, rim 24 and particles 26. The supports for the Helmholtz coils and plate 20, as well as plate 20 and rim 24, are composed of a nonmagnetic material so as to not affect the magnetic field. The presence of the magnetic field causes each of the particles to become magnetized and acquire dipole characteristics wherein each of the particles acquires a polarity that is oriented the same as adjacent particles. In other words, the magnetic field causes each of the particles to acquire a negative and positive pole and the poles of all the particles are aligned or arranged the same. As a result of this like polarization a mutual repulsion is set up between the particles and they attain an equilibrium configuration in which all the particles are uniformly spaced on the plate. If necessary the particles can be vibrated, by tapping the plate for instance, to aid in their dispersion over the plate. The belljar is then replaced, in the position shown in FIG. 1, and the interior of the vacuum evaporator is evacuated by the vacuum pump. Heater element 8, contains a quantity of tungsten which is vaporized when the heater element is energized. The tungsten vapor descends downwardly in a vertical path to form a thin film 29 on the plate. The heating element 8 of the vacuum evaporator is elevated above plate 20 sufficiently so that the tungsten vapor will be descending downwardly toward the plate in a vertical path perpendicular to plate 20 when the vapor reaches the upper surface thereof. When the particles are spherical it is necessary that the thickness of the film deposited not exceed one half the diameter of the particles. The reason for this thickness limitation will be more readily understood by considering FIG. 3 of the drawings which is an enlarged view of a portion of plate 20 having a film 29 and particles 26 disposed thereon. Due to the fact that the tungsten vapor descends downwardly in a vertical path there will be no tungsten deposited on the surface area of the spherical particles indicated by the numeral 28 in FIG. 3. This area extends from the center of the sphere, indicated by center line 25, downwardly to the upper surface of film 29. Also, due to the vertical path of the tungsten vapor there will be no build up of tungsten against the underside of the spheres in the area indicated by the numeral 31. Thus, the holes in the screen will be circular and equal to the diameter of the sphere 26. The tungsten film will, however, contact and adhere to the spherical particles at the point indicated by the numeral 32. When the tungsten film has been deposited upon the plate, the Helmholtz coils, the heater element, and vacuum pump are turned off and the belljar is removed from base 6. Rim 24 is removed from plate 20 and the tungsten film and particles are stripped from plate 20. The film and particles are then immersed in a suitable chemical reagent 37, see FIG. 7, which will dissolve the particles and leave only a tungsten film in the form of a screen. It is apparent from FIG. 3 that film 29 is in contact around the surface of sphere 26 only at a point indicated by the numeral 32; thus when the spheres are subjected to the action of the chemical reagent, the particles will either fall out of the film when a small amount of the outer portion of the sphere has been dissolved or will be dissolved completely if left in the chemical reagent long enough. The layer of tungsten 27 deposited upon the spherical particles during the evaporation process will also fall away when the spherical particles either falls away or is dissolved by the chemical reagent.

The particles 26, film 29, and chemical reagent can be composed of any suitable substance within certain limits. Particles 26 must have sufficient magnetic permeability so as to be substantially evenly dispersed over the surface of plate 20 when subjected to a magnetic field. The composition of the film material would be determined by the use for which the screen is intended and the chemical reagent used must be such that the particles and not the film will be dissolved.

When spherical particles are utilized the thickness of the screen which can be produced, as discussed above, is limited to one half the diameter of the spheres. However, if it be desired to produce a screen of greater thickness, an arrangement such as that shown in FIG. 4 can be utilized. In this embodiment the spherical particles have been replaced with rod-shaped or cylindrical particles 34 composed of a suitable magnetic material. A film having a thickness slightly less than the length of the rod can be deposited and, if a thicker film is desired it is only necessary to employ rods of greater length. When the rods are subjected to the magnetic field produced by the Helmholtz coils they will not only be uniformly spaced due to a liked polarization, as in the case of the spherical particles, but they will assume a position in which their longitudinal axes are perpendicular to plate 20. A layer of tungsten 33 will be deposited on the upper surface of each of the rod-shaped particles 34, however, inasmuch as the tungsten vapor is again deposited downwardly in a vertical path there will be no tungsten deposits on the vertical surfaces, indicated by the numeral 35, of the rod-shaped particles between the upper end thereof and the upper surface of tungsten layer 36.

Another embodiment of the invention is illustrated in FIG. 5. In this embodiment the iron particles are replaced with particles 38 composed of an iron rod or cylinder 40 having a coating of aluminum 39 applied thereto. The aluminum coated particles are uniformly dispersed and a tungsten film applied therearound in the same manner as discussed heretofore. However, after removal from the plate the particles and film are heated rather than immersed in a chemical reagent. The melting point of aluminum is 660 degrees centigrade. Iron melts at 1535 degrees centigrade and tungsten melts at 3370 degrees centigrade. Therefore, if the film and particles are heated to a temperature in excess of 660 degrees centigrade, the aluminum coating will melt and the iron particles will drop out of the tungsten film leaving only the tungsten film with holes therein having a diameter equal to the diameter of the composite rod-shaped particles.

The embodiment shown in FIG. 6 is similar to that illustrated in FIG. 5 except that spherical-shaped particles 42 having an iron core 44 and an aluminum outer coating 46 applied thereto are employed rather than rod-shaped particles.

This completes the detailed description of the invention, however, it should be understood that many changes and modifications thereto, by those skilled in the art to which this invention pertains, can be made without departing from the spirit and scope of the invention as defined by the claims appended hereto.

What is claimed is:

1. The method of making a screen comprising the steps of:
    (a) placing a plurality of magnetically permeable spherical particles on a nonmagnetic plate within an area defined by a nonmagnetic rim mounted on said plate,
    (b) subjecting said particles to a vertically oriented magnetic field whereby said particles will be dispersed and assume a position wherein said spherical particles are substantially evenly spaced in a single layer on said plate within the area defined by said rim,
    (c) depositing a film that adheres to said particles, said film being deposited on said plate around the particles, said film being deposited to a thickness that is less than one half the diameter of said particles,
    (d) removing said film and particles from said plate, and
    (e) dissolving said particles from the film to form a screen.

2. The method of making a screen comprising the steps of:
    (a) placing a plurality of magnetically permeable, rod-shaped particles on a nonmagnetic plate within an area defined by a nonmagnetic rim mounted on said plate,
    (b) subjecting said rod-shaped particles to a vertically oriented magnetic field whereby said rod-shaped particles will be dispersed and assume a position wherein said rod-shaped particles are substantially evenly spaced in a single layer over said plate within an area defined by said rim; and, the longitudinal axes of said rod-shaped particles will be aligned perpendicular to said plate,
    (c) depositing a film that adheres to said particles, said film being deposited on said plate around the rod-shaped particles, said film being deposited to a thickness that is less than the length of said rod-shaped particles, (d) removing said film and rod-shaped particles from said plate, and (e) dissolving said particles from the film to form a screen.

3. A method of making a screen comprising the steps of:

(a) placing a plurality of magnetically permeable particles on a nonmagnetic plate within an area defined by a nonmagnetic rim mounted on said plate, said particles having an outer layer of material thereon having a melting point lower than that of the hereafter described film, (b) subjecting said particles to a vertically oriented magnetic field whereby said particles will be dispersed and assume a position wherein said particles are evenly spaced in a single layer over the plate within the area defined by said rim, (c) depositing a film on said plate around said particles, (d) removing the film and particles from said plate, and (e) heating said film and particles until the outer layer of said particles melts and permits the particles to drop away from the film, whereby said film is left in the form of a screen.

4. A method of making a screen comprising the steps of:

(a) dispersing a single layer of magnetic particles on a nonmagnetic plate, (b) subjecting said particles to a magnetic field whereby said particles will assume equally spaced positions over said plate, (c) depositing a film on said plate and around said particles to a thickness that is less than the thickness of said particles, (d) removing said film and particles from said plate, and (e) dissolving said particles from the film to form a a screen.

5. A method of making a screen comprising the steps of:

(a) placing a plurality of magnetically permeable particles in a single layer over a nonmagnetic plate within an area defined by a nonmagnetic rim mounted on said plate, (b) subjecting said particles to a vertically oriented magnetic field whereby said particles will be dispersed in a substantially evenly spaced single layer over said plate within the area defined by said rim, (c) depositing a film that adheres to said particles, said film being deposited on said plate around the particles, said film being deposited to a thickness that is less than the thickness of said particles, (d) removing said film and particles from said plate, and (e) removing said particles from the film to form a screen.

References Cited by the Examiner
UNITED STATES PATENTS

| | | | |
|---|---|---|---|
| 2,572,497 | 10/1951 | Law | 156—3 |
| 2,596,617 | 5/1952 | Teal | 156—11 |
| 2,644,208 | 7/1953 | Auphan | 22—200 |
| 2,864,139 | 12/1958 | Le May | 22—200 |
| 3,113,896 | 12/1963 | Mann | 156—3 |

OTHER REFERENCES

Lightweight Cellular Metal in Transaction of American Foundryman, vol. 69 (1961), pages 65 to 79.

MARCUS U. LYONS, *Primary Examiner.*